Oct. 24, 1939.  J. A. JEPSON  2,177,410
BELT
Filed June 13, 1938
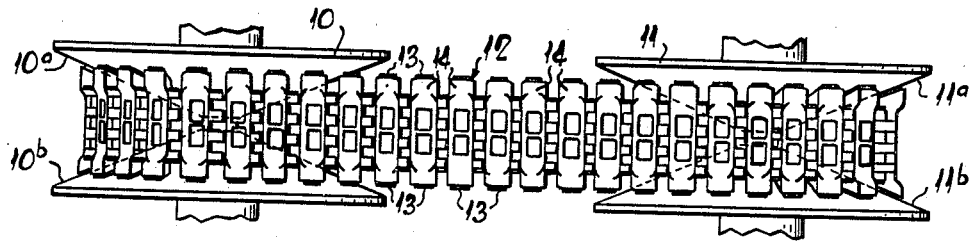
Fig. 1
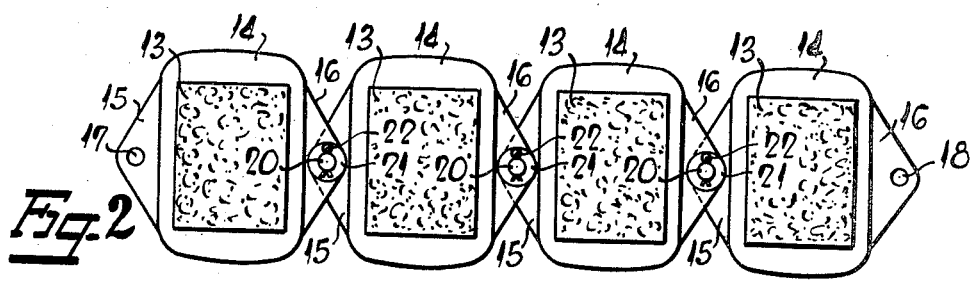
Fig. 2
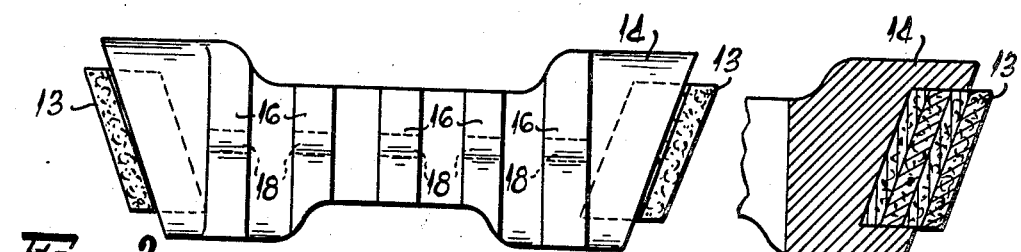
Fig. 3
Fig. 5
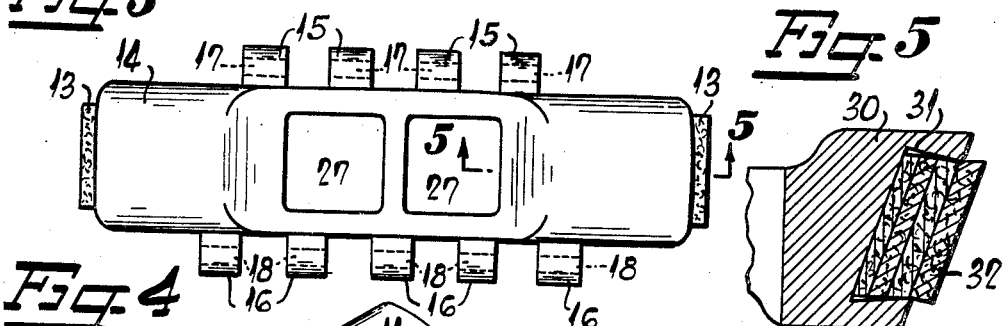
Fig. 4
Fig. 7
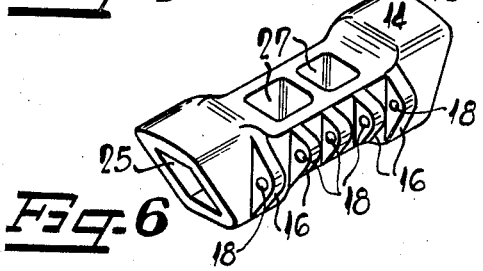
Fig. 6
Inventor:
JAMES A. JEPSON
By  *(signature)*
Attorney Patented Oct. 24, 1939

2,177,410

UNITED STATES PATENT OFFICE 2,177,410

BELT

James A. Jepson, Decatur, Ga.

Application June 13, 1938, Serial No. 213,377

1 Claim. (Cl. 74—234)

This invention relates to an improvement in a belt and more especially to a belt which is V-typed in cross section and which is adapted to operate upon V-type expansion pulleys. Belts of this type are particularly adaptable for use on variable speed drives which consist of two pairs of cone pulleys with this V-type belt mounted thereon. The present belt comprises a series of transversely disposed links pivotally secured to each other to form an endless chain. The remote ends of each link in the chain have a cavity therein into which a wearing tip is inserted. When the belt is mounted upon the V-type pulleys, the wearing tips in each end of the transverse links engage the proximate faces of the V-pulleys on their respective shafts so that rotation may be imparted from one shaft to the other. Heretofore great difficulty has been experienced in replacing the tips on the end of each of these links since the links are usually constructed of wood with the tips nailed to each end thereof.

It is, therefore, an object of this invention to provide a belt of the link type, each of said links having a cavity in opposed ends thereof for the reception of a tip, which will act as a wearing surface. By providing a cavity within the end of the link, it is possible to insert or remove a tip at will, without removing the belt from the pulleys.

It is a further object of this invention to provide a belt of the class described, the links of which comprise a metallic shell having projecting lugs from each side thereof, the lugs on one side being staggered with the lugs on the other, and a transverse hole through the center of said lugs so that a connecting pin may be inserted through the holes in the overlapped lugs on the adjacent links to form a continuous belt.

It is a still further object of this invention to provide a metallic link for a belt, the ends of which have a cavity for the reception of the wearing tip said cavity being larger in cross-section at its base than at the opening so that after a tip has been inserted within the cavity and pressure applied thereto, the base of the tip will expand into the enlarged portion of the cavity, and be securely fastened to the link.

Some of the objects of the invention having been stated, other objects will appear as the description proceeds, when taken in connection with the accompanying drawing, in which:

Figure 1 is a plan view showing a pair of pulleys with my improved belt mounted thereon;

Figure 2 is an enlarged elevation looking at the near side of a portion of the belt as shown in Figure 1;

Figure 3 is a side elevation of one of the links on the belt, looking at the right hand side of Figure 2;

Figure 4 is a top plan view of Figure 3;

Figure 5 is a vertical sectional view taken along the line 5—5 in Figure 4;

Figure 6 is an isometric view of the link as shown in Figures 3 and 4 but having the wearing tips in the ends thereof removed;

Figure 7 is a vertical sectional view similar to Figure 5, but showing a slightly modified form of link.

Referring more specifically to the drawing, the numerals 10 and 11 denote suitable V-type transmission pulleys upon which my improved belt 12 is adapted to be mounted. The pulley 10 has beveled faces 10a and 10b whereas the pulley 11 has similar beveled faces 11a and 11b which faces are adapted to be engaged by the laminated wearing tips 13 in the remote ends of the links 14 when the belt is in operation. The links 14 are preferably formed of suitable light-weight metal such as aluminum, and each of these links has integral therewith lugs 15 and 16, the lug 15 being disposed in staggered relation on the other side. Disposed in the lugs 15 and 17 are transversely disposed holes 17 and 18, respectively. When a series of links such as 14 are placed in the position shown in Figure 2 it is seen that the lugs 15 and 16 overlap each other so that the holes 17 and 18 will coincide, after which a suitable pin 20 is inserted through these holes to tie the links together. The end of pin 20 has a suitable washer 21 placed thereon and a cotter pin 22 is inserted therethrough to insure that the pin will remain in position when it is inserted. Each end of the link 14 has a cavity 25 therein into which the wearing tip 13 is adapted to be inserted. This tip is secured within the cavity by any suitable means such as gluing and the like.

It will be noted by referring to Figures 3 and 6 that the ends of the links 14 and the wearing tips 13 are beveled to conform to the beveled surfaces 10a, 10b, 11a and 11b. Also it should be noted that the wearing tips extend a substantial distance beyond the ends of a metallic link 14, so that the metallic links will not engage the beveled faces of the V-type pulleys.

By providing such an arrangement it is seen that the tips 13 may be easily removed from the metallic links without injuring the links in any manner. In order to reduce the weight of the link 14 to a minimum, suitable holes 27 are provided in the central portion thereof. A belt of this type is very much lighter than a belt formed of other types of material and in addition has the advantage of having easily replaceable links and wearing surfaces.

Figure 7 shows a slightly modified form of the invention in which a link 30 is provided having a cavity 31 in its end for the reception of a contact block 32. It will be noted that this cavity is larger in cross-section at its base, than it is at the outer end; consequently, when the wearing block is inserted therein, and the belt placed in operation, the pressure exerted upon the block will naturally expand the base portion thereof and cause it to be locked in position. This is especially true where the wearing block is made of fibrous material such as leather. It is, therefore, seen that I have provided a belt formed from metallic links having means for removably carrying wearing blocks in the ends thereof, said belt being of light weight construction, durable and low-priced in production.

In the drawing and specification, there has been set forth a preferred embodiment of the invention, and although specific terms are employed, they are used in a generic and descriptive sense only, and not for purposes of limitation, the scope of the invention being set forth in the appended claim.

I claim:

A belt comprising a plurality of one-piece metallic blocks having on each side thereof a plurality of spaced projecting portions provided with alined holes, the projections on one side of the blocks being off-set with relation to the projections on the other side of the blocks so that the projections on one block can be slipped between the projections on another block and a pin inserted through both projections to pivotally secure the blocks together, the ends of the blocks being enlarged and having a surface inclined at an angle to the longitudinal center of the block and having a cavity in the ends thereof, a friction member of wear resisting material disposed in each end of said cavities and projecting outwardly beyond the end surfaces of the block, the intermediate portion of each block having holes piercing the block to reduce the weight of the block without appreciably weakening the block.

JAMES A. JEPSON.